United States Patent
Nishimura et al.

(10) Patent No.: US 8,953,118 B2
(45) Date of Patent: Feb. 10, 2015

(54) LIQUID CRYSTAL DISPLAY APPARATUS

(75) Inventors: Akinori Nishimura, Ibaraki (JP);
Hiroyuki Takemoto, Ibaraki (JP);
Takehito Fuchida, Ibaraki (JP); Minoru Miyatake, Ibaraki (JP); Shunsuke Shutou, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 8 days.

(21) Appl. No.: 13/512,673

(22) PCT Filed: Nov. 26, 2010

(86) PCT No.: PCT/JP2010/071143
§ 371 (c)(1),
(2), (4) Date: Aug. 8, 2012

(87) PCT Pub. No.: WO2011/065490
PCT Pub. Date: Jun. 3, 2011

(65) Prior Publication Data
US 2012/0307179 A1 Dec. 6, 2012

(30) Foreign Application Priority Data
Nov. 30, 2009 (JP) ................................. 2009-272626

(51) Int. Cl.
*G02F 1/1335* (2006.01)

(52) U.S. Cl.
CPC .... *G02F 1/133606* (2013.01); *G02F 1/133504* (2013.01); *G02F 2001/133607* (2013.01)
USPC .................. 349/62; 349/61; 349/63; 349/65; 349/112

(58) Field of Classification Search
USPC ........................................ 349/61–63, 65, 112
See application file for complete search history.

(56) References Cited

U.S. PATENT DOCUMENTS 6,527,410 B2  3/2003  Yamaguchi
6,924,856 B2  8/2005  Okumura et al.
(Continued)

FOREIGN PATENT DOCUMENTS

JP  10-62779 A   3/1998
JP  11-142819 A  5/1999
(Continued)

OTHER PUBLICATIONS

IEEJ Journal, vol. 125, No. 9, 2005, pp. 578-581. Cited in specification. [The year of the publication is sufficiently earlier than the effective U.S. filing date and any foreign priority date; see MPEP 609.04(a)(1)].
(Continued)

*Primary Examiner* — Bumsuk Won
*Assistant Examiner* — Charles Chang
(74) *Attorney, Agent, or Firm* — Westerman, Hattori, Daniels & Adrian, LLP

(57) ABSTRACT

A liquid crystal display apparatus according to an embodiment of the invention includes: a liquid crystal cell; polarizing plates placed on both sides of the liquid crystal cell; a light diffusing element provided outside of the polarizing plate on a viewer side; and a backlight unit provided outside of the polarizing plate on an opposite side of the viewer side. The backlight unit includes a collimated light source device that emits collimated light having a brightness half-value angle of 3° to 35° toward the liquid crystal cell, and a ratio Fw(BL)/Fw(FD) between a diffused light half-value angle Fw(FD) of the light diffusing element and the brightness half-value angle Fw(BL) of the collimated light is 0.5 or less.

4 Claims, 4 Drawing Sheets

(56) References Cited

U.S. PATENT DOCUMENTS

| | | |
|---|---|---|
| 7,123,337 B2 | 10/2006 | Okumura et al. |
| 7,573,549 B2 | 8/2009 | Nishihara et al. |
| 2001/0017674 A1* | 8/2001 | Yamaguchi ............ 349/61 |
| 2002/0191128 A1 | 12/2002 | Okumura et al. |
| 2003/0053009 A1* | 3/2003 | Sato et al. ............ 349/95 |
| 2005/0190318 A1 | 9/2005 | Okumura et al. |
| 2005/0206804 A1 | 9/2005 | Hara |
| 2008/0049165 A1 | 2/2008 | Min et al. |
| 2008/0055523 A1 | 3/2008 | Nishihara et al. |
| 2008/0191997 A1 | 8/2008 | Min et al. |
| 2008/0304791 A1* | 12/2008 | Takatori et al. ............ 385/39 |
| 2009/0244447 A1* | 10/2009 | Hou et al. ............ 349/96 |
| 2010/0238379 A1 | 9/2010 | Shutou et al. |
| 2010/0283940 A1 | 11/2010 | Takemoto et al. |

FOREIGN PATENT DOCUMENTS

| | | |
|---|---|---|
| JP | 11-281818 A | 10/1999 |
| JP | 2001-215501 A | 8/2001 |
| JP | 2002-023170 A | 1/2002 |
| JP | 2002-372713 A | 12/2002 |
| JP | 2003-337335 A | 11/2003 |
| JP | 2004-38009 A | 2/2004 |
| JP | 2006-251352 A | 9/2006 |
| JP | 2007-047409 A | 2/2007 |
| JP | 2007-241191 A | 9/2007 |
| JP | 2008-83294 A | 4/2008 |
| JP | 2008-191494 A | 8/2008 |
| JP | 2008-197652 A | 8/2008 |
| JP | 2008-216315 A | 9/2008 |
| JP | 2009-031792 A | 2/2009 |
| JP | 2009-084566 A | 4/2009 |
| JP | 2009-251195 A | 10/2009 |

OTHER PUBLICATIONS

International Search Report of PCT/JP2010/071143, mailing date Dec. 21, 2010.

Japanese Office Action dated Feb. 5, 2014, issued in corresponding Japanese application No. 2010-263603, w/ English translation (6 pages).

Japanese Office Action dated Sep. 4, 2013, in corresponding Japanese Application No. 2010-263257, w/English Translation. (6 pages).

Decision of Final Rejection dated Dec. 4, 2013, issued in Japanese application No. 2010-263257, w/ English translation.

Japanese Office Action dated Oct. 9, 2013, issued in Japanese Patent Application No. 2010-263603, w/English translation (10 pages).

Extended European Search Report dated Oct. 11, 2013, issued in corresponding European Patent Application No. 10833336.0 (8 pages).

* cited by examiner

LIQUID CRYSTAL DISPLAY APPARATUS

TECHNICAL FIELD

The present invention relates to a liquid crystal display apparatus. More specifically, the present invention relates to a liquid crystal display apparatus incorporating a collimated backlight and front diffusing system, which has high contrast and excellent uniformity of image quality over an entire region within an angle range of view and in which small display unevenness such as moiré and glare is suppressed.

BACKGROUND ART

In order to enhance a front contrast ratio of a liquid crystal display apparatus, procedures have heretofore been taken to reduce depolarized light scattering within a liquid crystal cell as much as possible through the enhancement of pigment dispersibility of a color filter, the optimization of a liquid crystal material and a spacer material, the optimization of the position of TFT wiring and the alignment protrusion in MVA, etc. (for example, Patent Literature 1 and Patent Literature 2). Regarding a member other than the liquid crystal cell, a study of reducing the scattering property of antiglare treatment is being conducted. Further, regarding backlight, there is a technology of increasing light condensing performance to enhance a front contrast ratio (for example, Patent Literature 3). However, even with those technologies, a liquid crystal display apparatus exhibiting a sufficiently high front contrast ratio has not been obtained.

Further, an angle range of view contrast (average contrast within an angle range of view at which a human being appreciates) as well as a front contrast is becoming important characteristics along with the enlargement of a screen of a liquid crystal display apparatus. For example, an appreciation distance recommended in a high-definition video is about three times a height H of a screen, which corresponds to a horizontal angle range of view of about 30° (for example, Non Patent Literature 1). In a conventional liquid crystal display apparatus, the angle range of view contrast decreases by about 20% to 30% compared with the front contrast. Further, increasing importance has also been placed on the uniformity of image quality within an angle range of view.

CITATION LIST

Patent Literature

[PTL 1] JP 2008-216315 A
[PTL 2] JP 2002-23170 A
[PTL 3] JP 2008-197652 A

Non Patent Literature

[NPL 1] IEEJ Journal Vol. 125, No. 9, 2005

SUMMARY OF INVENTION

Technical Problems

The present invention has been made in view of solving the above-mentioned problems, and it is an object of the present invention to provide a liquid crystal display apparatus which has high contrast and excellent uniformity of image quality over an entire region within an angle range of view and in which small display unevenness such as moiré and glare is suppressed.

Solution to Problem

The inventors of the present invention have conducted extensive studies with regard to contrast in each direction of a liquid crystal display apparatus and have found that a liquid crystal display apparatus incorporating a collimated backlight and front diffusing system and in which optical properties of a backlight unit and a light diffusing element are regulated can solve the above-mentioned problems, to thereby complete the invention.

A liquid crystal display apparatus according to an embodiment of the invention includes: a liquid crystal cell; polarizing plates placed on both sides of the liquid crystal cell; a light diffusing element provided outside of the polarizing plate on a viewer side; and a backlight unit provided outside of the polarizing plate on an opposite side of the viewer side. The backlight unit includes a collimated light source device that emits collimated light having a brightness half-value angle of 3° to 35° toward the liquid crystal cell, and a ratio Fw(BL)/Fw(FD) between a diffused light half-value angle Fw(FD) of the light diffusing element and the brightness half-value angle Fw(BL) of the collimated light is 0.5 or less.

In one embodiment of the invention, the liquid crystal display apparatus has a panel size of 32 inches or more.

In one embodiment of the invention, the liquid crystal cell includes a VA mode liquid crystal cell or an IPS mode liquid crystal cell.

Advantageous Effects of Invention

According to the present invention, the liquid crystal display apparatus incorporates the collimated backlight and front diffusing system, the brightness half-value angle of collimated light is regulated, and the ratio Fw(BL)/Fw(FD) between the diffused light half-value angle Fw(FD) of the light diffusing element and the brightness half-value angle Fw(BL) of collimated light is optimized. Therefore, the liquid crystal display apparatus which has high contrast and excellent uniformity of image quality over the entire region within the angle range of view and in which small display unevenness such as moiré and glare is suppressed can be obtained.

DESCRIPTION OF EMBODIMENTS

Hereinafter, embodiments of the present invention are described with reference to the drawings. However, the present invention is not limited to these specific embodiments.

A. Entire Configuration of a Liquid Crystal Display Apparatus

Figure 1:
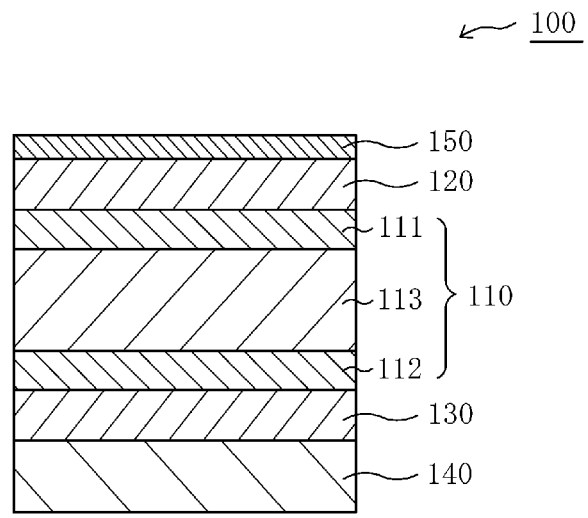
FIG. 1 is a schematic cross-sectional view of a liquid crystal display apparatus according to an embodiment of the present invention.

FIG. 1 is a schematic cross-sectional view of a liquid crystal display apparatus according to an embodiment of the present invention. A liquid crystal display apparatus 100 includes a liquid crystal cell 110, polarizing plates 120 and 130 placed on both sides of the liquid crystal cell 110, a backlight unit 140 provided outside of the polarizing plate 130, and a light diffusing element 150 provided outside (viewer side) of the polarizing plate 120. The backlight unit 140 is a collimated light source device for emitting collimated light to the liquid crystal cell 110. That is, the liquid crystal display apparatus 100 incorporates a collimated backlight and front diffusing system. The collimated backlight and front diffusing system refers to a system in a liquid crystal display apparatus, which uses collimated backlight (backlight with a small brightness half-value width, condensed in a predetermined direction) and is provided with a front light diffusing element on the viewer side of an upper-side polarizing plate. The polarizing plates 120 and 130 are placed so that absorption axes of respective polarizers are perpendicular or parallel to each other. Any suitable optical compensation plate (retardation plate) (not shown) can be placed between the liquid crystal cell 110 and the polarizing plate 120 and/or 130 depending upon the purpose. The optical properties, number of arrangement, arrangement position, and the like of the optical compensation plate can be set appropriately depending upon the drive mode and desired properties of a liquid crystal display apparatus. The liquid crystal cell 110 includes a pair of substrates (typically, glass substrates) 111 and 112, and a liquid crystal layer 113 containing liquid crystal as a display medium placed between the substrates 111 and 112.

In the present invention, the brightness half-value angle (hereinafter, also referred to as "backlight half-value angle") of collimated light output from the backlight unit 140 is 3° to 35°, preferably 4° to 20°, more preferably 4° to 11°. If the backlight half-value angle is within such a range, moiré and glare can be prevented satisfactorily. In the case where the half-value angle is less than 3°, light output from the respective condensing elements or lenses in the collimated backlight is not mixed to be averaged before entering the liquid crystal cell. Therefore, the pattern of pixels and the arrangement of the condensing elements or lenses or the pitch of prism elements interfere with each other, which may cause degradation in image quality, such as moiré and glare. When the half-value angle is more than 35°, the quantity of incident light from a front surface having less depolarized light scattering becomes small, and contrast may become insufficient.

Figure 2:
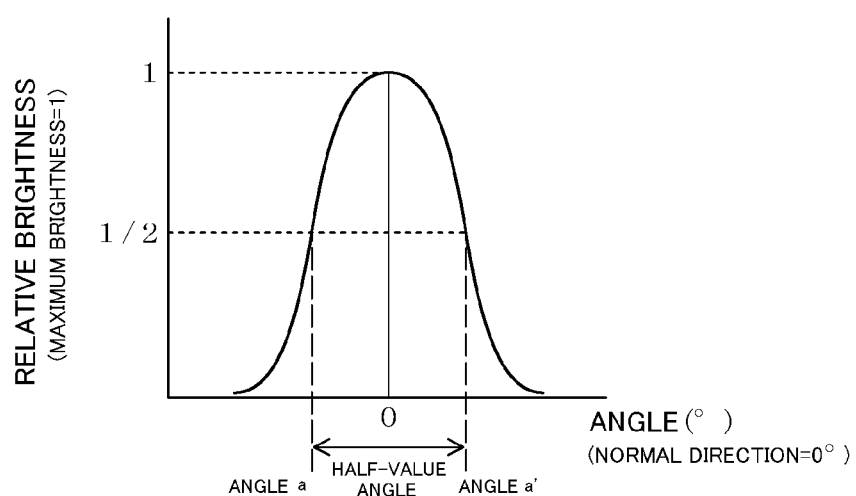
FIG. 2 is a schematic diagram illustrating a method of calculating a brightness half-value angle.

Further, in the present invention, the ratio Fw(BL)/Fw(FD) between the diffused light half-value angle Fw(FD) of the light diffusing element 150 and the brightness half-value angle Fw(BL) of the collimated light is 0.5 or less, preferably 0.025 to 0.5, more preferably 0.04 to 0.2. By setting Fw(BL)/Fw(FD) in such a range, the front brightness can be kept high and the brightness in an oblique direction can be set to be sufficiently high. As a result, it is possible to obtain a liquid crystal display apparatus which is excellent in any of a front contrast, an angle range of view contrast, and uniformity of image quality within the angle range of view. The "brightness half-value angle of collimated light" as used herein refers to an angle obtained by measuring a brightness with respect to an output angle in a predetermined direction within an output surface when collimated light is output from the backlight unit, measuring an output angle corresponding to the half of a maximum value of the brightness (brightness at an output angle of 0°) on both sides as illustrated in FIG. 2, and adding the angles on both sides (angle a+angle a' of FIG. 2). Further, unless otherwise specified, the "brightness half-value angle of collimated light" refers to an average between a brightness half-value angle in the vertical direction (up-down direction of the panel screen) and a brightness half-value angle in the horizontal direction (right-left direction of the panel screen).

The white brightness half-value angle of the liquid crystal display apparatus is preferably 75° or less, more preferably 70° or less. Further, the light quantity distributed in a range of an angle larger than the white brightness half-value angle (hereinafter, referred to as light distribution quantity or light distribution ratio) is preferably in a range of 40% to 55%, more preferably in a range of 42% to 52%, still more preferably 44% to 50% with respect to the total quantity of output light in white display. Through the control of the white brightness half-value angle and the light distribution quantity in such a range, a liquid crystal display apparatus which is more excellent in front contrast, angle range of view contrast, and uniformity of image quality within an angle range of view can be obtained. The "white brightness half-value angle" is defined similarly to the brightness half-value angle of collimated light. The "light distribution quantity" schematically refers to the quantity to be distributed outside of the angle a and the angle a' among light output from the backlight in FIG. 2. The light distribution quantity (light distribution ratio) is obtained from the following expression, assuming that the brightness at an azimuth angle of Φ and a polar angle of θ is I.

$$\text{Light distribution ratio} \equiv 1 - \frac{\int_{\Phi=0}^{360°} \int_{\theta=0}^{\frac{a+a'}{2}} I(\Phi, \theta)\cos\theta\sin\theta\, d\theta\, d\Phi}{\int_{\Phi=0}^{360°} \int_{\theta=0}^{89°} I(\Phi, \theta)\cos\theta\sin\theta\, d\theta\, d\Phi} \qquad [\text{Math. 1}]$$

As the drive mode of liquid crystal of the liquid crystal layer, any suitable drive mode can be used. Specific examples thereof include a vertical alignment (VA) mode (for example, multi-domain vertical alignment (MVA) mode and a pattern VA (PVA) mode), a twisted nematic (TN) mode, an electrically controlled birefringence (ECB) mode, an optically compensated bend (OCB) mode, and an in-plane switching (IPS) mode (for example, a comb-shaped electrode IPS mode and a fringe field switching (FFS) mode). The VA mode and the IPS mode are preferred.

B. Polarizing Plate

As the polarizing plates 120 and 130, any suitable polarizing plates can be used respectively. The polarizing plate typically has a polarizer and a protective layer placed on one side or both sides of the polarizer. The polarizer and the protective layer are laminated via any suitable pressure-sensitive adhesive layer or adhesive layer.

B-1. Polarizer

Any suitable polarizer can be adopted as the polarizer depending on purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated polyvinyl alcohol film or a dehydrochlorinated polyvinyl chloride film. Of those, a polarizer prepared by adsorbing a dichromatic substance such as iodine on a polyvinyl alcohol-based film and uniaxially stretching the film is particularly preferred because of high polarized dichromaticity. The thickness of the polarizer is not particularly limited, and is generally about 1 to 80 μm.

The polarizer prepared by adsorbing iodine on a polyvinyl alcohol-based film and uniaxially stretching the film may be produced by, for example: immersing polyvinyl alcohol in an aqueous solution of iodine for coloring; and stretching the film to a 3 to 7 times length of the original length. The aqueous solution may contain boric acid, zinc sulfate, zinc chloride, or the like if necessary, or the polyvinyl alcohol-based film may be immersed in an aqueous solution of potassium iodide or the like. Further, the polyvinyl alcohol-based film may be immersed and washed in water before coloring if necessary.

Washing the polyvinyl alcohol-based film with water not only allows removal of contamination on a film surface thereof or washing away of an antiblocking agent, but also provides an effect of preventing unevenness such as uneven coloring by swelling the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

B-2. Protective Layer

The protective layer is formed of any suitable film which can be used as a protective layer for a polarizing plate. As a material used as a main component of the film, there are specifically exemplified a cellulose-based resin such as triacetylcellulose (TAC), and transparent resins such as a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin such as a lactone-modified acrylic resin, and an acetate-based resin. Further, there are exemplified a (meth)acrylic, urethane-based, (meth)acrylic urethane-based, epoxy-based, or silicone-based thermosetting resin or UV-curable resin. Still further, there is exemplified a glassy polymer such as a siloxane-based polymer. In addition, a polymer film described in JP 2001-343529 A (WO 01/37007 A1) may also be used. Specifically, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof is a resin composition containing an alternate copolymer of isobutene and N-methylmaleimide, and an acrylonitrile/styrene copolymer. The polymer film may be an extruded product of the resin composition, for example.

C. Backlight Unit

The backlight unit 140 may have any suitable configuration capable of emitting the predetermined collimated light. For example, the backlight unit includes a light source and a condensing element for collimating light emitted from the light source (each of which is not shown). In this case, any suitable condensing element capable of collimating light emitted from the light source can be adopted as the condensing element. When the light source itself may emit the collimated light, the condensing element may be omitted. The followings are exemplified as a specific configuration of the backlight unit (collimated light source device): (1) a configuration in which a condensing element in which a light shielding layer or a reflective layer is provided in a portion except a lens focus on a flat surface side of a lenticular lens or cannonball type lens is located on a liquid crystal cell side of a light source (for example, cold cathode fluorescent lamp) (for example, JP 2008-262012 A); (2) a configuration which includes a side light type LED light source, a light guide plate, and a variable angle prism which has a convex surface formed on a light guide plate side and is provided on a liquid crystal cell side of the light guide plate (in this configuration, anisotropic diffusing element may be further used if necessary; for example, JP 3442247 B2); (3) a configuration in which a louver layer in which a light absorbing resin and a transparent resin are alternately formed in a stripe shape is provided between a backlight and a backlight-side polarizing plate (for example, JP 2007-279424 A); (4) a configuration using a cannonball type LED as a light source (for example, JP 06-130255 A); and (5) a configuration using a Fresnel lens and, if necessary, a diffusion plate (for example, JP 01-126627 A). The documents describing the detailed configurations are herein incorporated by reference.

As described above, the brightness half-value angle (backlight half-value angle) of collimated light output from the backlight unit is 3° to 35°, preferably 4° to 20°, more preferably 4° to 11°.

An example of other means for preventing moiré and glare in the liquid crystal display apparatus of the present invention is to regulate the distance between the backlight unit (substantially, condensing elements, condensing lenses, or prism elements) and the color filters in the liquid crystal cell. More specifically, in the liquid crystal display apparatus of the present invention, the distance between the viewer-side surface of the backlight unit and the backlight-side surface of the backlight-side polarizing plate is set to be preferably 1,000 μm to 1 mm. Through the setting of the distance in such a range, the light (collimated light) output from the backlight unit is averaged sufficiently before reaching a pixel, and hence the interference of the light with the condensing elements and the like is prevented, which can prevent moiré and glare.

An example of another means is to control a pitch P1 of the condensing elements, the condensing lenses, or the prism elements and control a ratio P1/P2 between P1 and a pixel pitch P2. P1 is preferably 25 μm to 1,000 μm. P1/P2 is preferably 0.1 to 2. An example of still another means is to arrange the condensing elements, the condensing lenses, or the prism elements and the color filter pixels so that the direction of the condensing elements, the condensing lenses, or the prism elements and the arrangement direction of the color filter pixels of the same color may define a predetermined angle. The angle is preferably 15° to 90°, more preferably 45° to 90°. Herein, for example, the direction of the prism elements refers to the direction in which each prism of the prism elements extends. For example, in the case where the respective pixels of R, G, and B are arranged in a straight line (that is, in the case where the color filters have a stripe-shaped pattern), the arrangement direction of the color filter pixels of the same color refers to the direction in which the straight line extends.

D. Light Diffusing Element

The light diffusing element 150 transmits and diffuses light (typically, collimated light as described above) having passed through the liquid crystal cell. In the present invention, a liquid crystal display apparatus having high front contrast can be realized by using, for example, a light diffusing element having a smooth surface, a light diffusing element having low surface reflectance, a light diffusing element having small backscattering, a light diffusing element having a diffusion half-value angle of 75° or less, or a light diffusing element having a combination of those properties. The use of such a light diffusing element can prevent undesired return of diffused light and generation of stray light caused by the return as well as "black float" caused by the stray light, which otherwise occur in a light diffusing element or on an interface between a light diffusing element and air. As a result, the decrease in contract can be prevented.

The light diffusing element having a smooth surface is typically a light diffusing element of an internal diffusion type (for example, containing light diffusible fine particles in the element). The surface roughness Ra of such a light diffusing element is preferably 0.10 µm or less, more preferably 0.05 µm or less, particularly preferably 0.01 µm or less. The light diffusing element having such a smooth surface is preferred because the return of diffused light is not caused by the total reflection at the interface with air as in a light diffusing element using the unevenness of the surface and hence the contrast is not decreased.

The light diffusing element having low surface reflectance is typically a light diffusing element provided with an antireflection layer. With the antireflection layer provided, the return of diffused light caused by the reflection at the interface between the light diffusing element and the air can be prevented. Examples of the antireflection layer include a fluorine resin layer, a resin layer containing nanoparticles (typically, hollow nanoparticles, e.g., hollow nanosilica particles), and an antireflection layer having a nanostructure (for example, a moth-eye structure). The thickness of the antireflection layer is preferably 0.05 µm to 1 µm. Examples of a method of forming the resin layer include a sol-gel method, a thermosetting method using isocyanate, and an ionization radiation curing method (typically, a light curing method) using a cross-linkable monomer (for example, polyfunctional acrylate) and a photopolymerization initiator. The refractive index of the antireflection layer is preferably 1.30 to 1.50. The surface reflectance of the light diffusing element provided with an antireflection layer is preferably 0.1% to 3.5%.

The light diffusing element having small backscattering is typically a light diffusing element in which light diffusible fine particles are dispersed in a matrix and a gradient index layer (GRIN layer) is present in the vicinity of the interface between the light diffusible fine particles and the matrix. Examples of a method of producing such a light diffusing element include a method of diffusing GRIN fine particles in a matrix and a method of forming a gradient index layer in a matrix on the periphery of the light diffusible fine particles. Further, an example of another light diffusing element having small backscattering is a light diffusing element in which a light-absorbing agent (for example, a pigment or a dye) is dispersed in a matrix or light diffusible fine particles.

Figure 3:
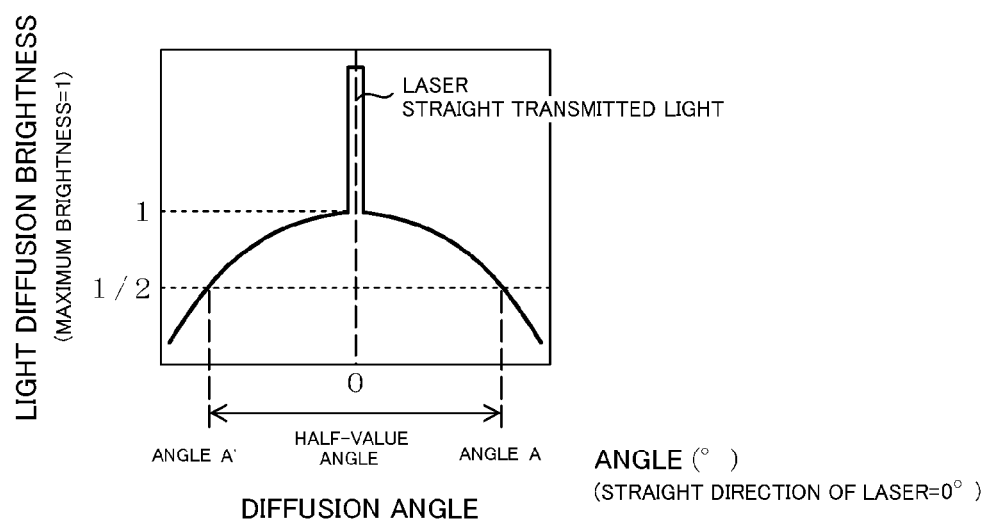
FIG. 3 is a schematic diagram illustrating a method of calculating a diffused light half-value angle.

The diffusion property of the light diffusing element 150 is preferably 75° or less, more preferably 10° to 75°, still more preferably 40° to 75° in terms of the diffused light half-value angle in any of the embodiments. In the case where the diffused light half-value angle is less than 10°, there is a possibility that uniform lightness may not be maintained within an angle range of view. When the diffused light half-value angle exceeds 75°, a wide-angle scattered light component is generated, which cannot be output from the surface of the light diffusing element due to the total reflection at the interface between the light diffusing element and the air, and the wide-angle scattered light component is reflected/diffused to other pixels or the inside of the panel, which may degrade image quality. The definition of the diffused light half-value angle is substantially the same as the white brightness half-value angle of the liquid crystal display apparatus and the brightness half-value angle of collimated light output from the backlight, except that the definition of a maximum brightness is different as in FIG. 3.

It is preferred that the light diffusing element 150 have a higher haze. Specifically, the haze is preferably 90% to 99%, more preferably 92% to 99%, still more preferably 95% to 99%, particularly preferably 97% to 99%. When the haze is 90% or more, the light diffusing element can be preferably used as a front light diffusing element in a collimated backlight and front diffusing system.

The light distribution quantity (light quantity distributed in a range of an angle larger than the diffused light half-value angle) in the light diffusing element 150 is preferably in a range of 40% to 60% with respect to the total quantity of light incident upon the light diffusing element. Through the setting of the light distribution quantity in such a range, the generation of a wide-angle scattered light component that cannot be output from the surface of the light diffusing element due to the total reflection at the interface between the light diffusing element and the air can be suppressed.

The thickness of the light diffusing element 150 can be set appropriately depending upon purposes and desired diffusion property. Specifically, the thickness of the light diffusing element is preferably 4 µm to 50 µm, more preferably 4 µm to 20 µm. In the case where the light diffusing element contains light diffusible fine particles, the thickness of the light diffusing element is preferably twice to 50 times the diameter of the light diffusible fine particles. Due to such a relationship between the thickness of the light diffusing element and the diameter of the light diffusible fine particles, a plurality of light diffusible fine particles can be dispersed or arranged in the thickness direction of the light diffusing element, and hence multiple scattering can be generated inside the light diffusing element. As a result, the collimated light (which is condensed to be in a non-uniform state) output from the backlight unit can be made uniform due to the multiple scattering in the light diffusing element, and, in combination with the appropriate setting of the backlight half-value angle, moiré and glare can be further prevented. In the case where the thickness of the light diffusing element is less than twice the diameter of the light diffusible fine particles, multiple scattering may be insufficient. Consequently, the uniformity of the collimated light output from the backlight unit may be insufficient. When the thickness of the light diffusing element is more than 50 times the diameter, mixed color may be generated between pixels caused by excess multiple scattering, and the blurring of characters or images may occur.

The light diffusing element 150 may be provided as a film-shaped or plate member independently or may be provided as a complex member adhered to any suitable base material or polarizing plate. Further, the antireflection layer may be laminated on the light diffusing element. Further, the light diffusing element may be applied to the protective film of the polarizing plate and the polarizing plate may be produced through the use of the protective film so that the light diffusing element 150 is integrated with the polarizing plate.

EXAMPLES

Hereinafter, the present invention is described in more detail by way of examples. However, the present invention is not limited to the examples. The evaluation methods in the examples are as follows. In addition, unless otherwise stated, "part(s)" and "%" in the examples are by weight.

(1) White Brightness Half-Value Angle and Backlight Half-Value Angle

A liquid crystal display apparatus that has performed white display or a backlight was set on an angle-brightness meter (Conoscope, manufactured by Autronic Melcher), with its long side direction being placed in the horizontal direction and its short side direction being placed in the vertical direction. Then, an angle-brightness was measured in the vertical and horizontal directions, and angles on both sides at which a half brightness of a maximum brightness was obtained were added to be used as half-value angles in the vertical and horizontal directions, respectively.

(2) Diffused Light Half-Value Angle of a Light Diffusing Element

The front surface of the light diffusing element was irradiated with laser light (green, wavelength: 532 nm), and a diffusion brightness with respect to a diffusion angle of diffused light was measured every 1° with a goniophotometer. Then, diffusion angles at which a half brightness of a maximum value of the diffused light brightness excluding straight transmitted light of a laser were measured on both sides of the diffusion, and the diffusion angles were added to be used as a half-width angle. Further, a ratio of the straight transmitted light of the laser with respect to the laser intensity of 0° before the irradiation was set to be a through transmittance.

(3) Light Distribution Quantity

In the measurement of the diffused light half-value angle of the light diffusing element, the white brightness half-value angle, or the backlight half-value angle, an average of vertical and horizontal half-value angles was set to be an average half-value angle, and a brightness was output every 1° of each of the azimuth angle $\Phi$ and the polar angle $\theta$ ($=I(\Phi,\theta)$), thereby obtaining a ratio calculated from the following expression as a light distribution quantity (light distribution ratio).

[Math. 2]

$$\text{Light distribution ratio} \equiv 1 - \frac{\int_{\Phi=0}^{360°} \int_{\theta=0}^{\frac{a+a'+a''+a'''}{4}} I(\Phi, \theta)\cos\theta\sin\theta\, d\theta\, d\Phi}{\int_{\Phi=0}^{360°} \int_{\theta=0}^{89°} I(\Phi, \theta)\cos\theta\sin\theta\, d\theta\, d\Phi}$$

where a, a', a", a"': one-side half-value angles in horizontal and vertical directions each.

(4) Angle Range of View Contrast

CA-1500, manufactured by Konica Minolta Holdings, Inc., was set at a position away from the center of a display screen by three times the height of the screen (1.23 m in the case of a 32-inch screen and 1.77 m in the case of a 46-inch screen) in the normal direction of the screen. Then, the screen was allowed to perform black display and white display, and an in-plane white brightness distribution and an in-plane black brightness distribution were measured and stored in connected software. After that, data of white brightness was divided by data of black brightness to calculate an in-plane contrast distribution. Among the contrasts of the respective regions obtained by dividing the screen at an equal interval (10 regions in height×10 regions in width), a lowest contrast value is defined to be a lowest contrast (generally, a value of any four corner regions of the screen), a highest contrast value is defined as a highest contrast (generally, a value of any of the regions in the vicinity of a center portion of the screen), and an arithmetic average value of the contrasts is defined to be an average contrast. In this example, a viewing angle was measured with an angle-brightness meter (Conoscope, manufactured by Autronic Melcher), and then a contrast within an angle range corresponding to a high definition angle range of view was extracted, thereby obtaining a maximum value, a minimum value, and an average value. Further, (maximum value−minimum value)/average value was used as an index for the uniformity of image quality within an angle range of view. That is, as this value was smaller, the uniformity of image quality within an angle range of view was evaluated to be excellent.

(5-1) Blurring of Characters

Three kinds of images (vertical stripe at intervals of one dot, horizontal stripe at intervals of one dot, and Chinese characters in 10×10 pixels) were output to the obtained liquid crystal display apparatus and visually observed at a distance of 50 cm. The case where all the three kinds of images were visually identified clearly was defined as ○, the case where one or two kinds seemed to be blurred was defined as Δ, and the case where any of the three kinds was blurred was defined as x.

(5-2) Blot of Characters and Images

A natural image and characters were output to the obtained liquid crystal display apparatus and visually observed at a distance of 1 m. The case where no blurring (blot) was identified was defined as ○, the case where blurring (blot) was identified was defined as Δ, and the case where blurring (blot) was conspicuous was defined as x.

(6) Moiré/Glare

Display was performed with only green color in the obtained liquid crystal display apparatus, and whether or not a stripe pattern was seen in an oblique or horizontal direction (presence/absence of moiré) and whether or not the brightness varied depending upon the pixel (presence/absence of glare) were observed visually. The case where none of moiré and glare was identified was defined as ○, the case where moiré and glare were identified slightly but on a practical level was defined as Δ, and the case where any one of moiré and glare was identified clearly was defined as x.

(7) Surface Roughness

The arithmetic average surface roughness Ra was measured according to JIS B 0601-2004. A measurement device and measurement conditions are as follows.

(i) Measurement device: Model No. ET4000 manufactured by Kosaka Laboratory Ltd.

(ii) Probe of surface roughness detecting portion: tip end radius of curvature: 2 μm, apex angle: 90°, and material: diamond (iii) Measurement conditions Reference length (cut-off value λc of roughness curve): 2.5 mm Evaluation length (reference length (cut-off value λc)×5): 12.5 mm Probe feed rate: 0.5 mm/s (8) Surface Reflectance and Backscattering Ratio The laminate of the light diffusing element and the base material obtained in reference examples was attached onto a black acrylic plate ("SUMIPEX" (trade name) (registered trademark), thickness: 2 mm, manufactured by Sumitomo Chemical Co., Ltd.) via a transparent pressure-sensitive adhesive to obtain a measurement sample. The integral reflectance of the measurement sample was measured with a spectrophotometer ("U4100" (trade name), manufactured by Hitachi Ltd.). On the other hand, a laminate of a base material and a transparent coating layer was obtained as a control sample, using an application liquid in which fine particles were removed from the application liquid for a light diffusing element. Then, the integral reflectance thereof (i.e., surface reflectance) was measured in the same way as described above. The integral reflectance (surface reflectance) of the control sample was subtracted from the integral reflectance of the measurement sample to calculate a backscattering ratio of the light diffusing element.

(9) Haze

Measurement was performed with a haze meter ("HN-150" (trade name), manufactured by Murakami Color Research Laboratory Co., Ltd.) in accordance with a method specified in JIS 7136.

(10) Thickness

The total thickness of a base material and a light diffusing element was measured with a microgauge-type thickness meter (manufactured by Mitutoyo Corporation), and the thickness of the base material was subtracted from the total thickness to calculate the thickness of the light diffusing element.

Reference Example 1

Production of a Light Diffusing Element

To 100 parts of a hard coat resin ("Opstar KZ6661" (trade name) (containing MEK/MIBK), manufactured by JSR Corporation), 11 parts of pentaerythritol triacrylate ("Biscoat #300" (trade name), refractive index: 1.52, manufactured by Osaka Organic Chemical Industry Ltd.), 0.5 part of a photopolymerization initiator ("Irgacure 907" (trade name), manufactured by Ciba Specialty Chemicals), 0.5 part of a leveling agent ("GRANDIC PC 4100" (trade name), manufactured by DIC Corporation), and 15 parts of polymethyl methacrylate (PMMA) fine particles ("XX131AA" (trade name), average particle diameter: 2.5 µm, refractive index: 1.49, manufactured by SEKISUI PLASTICS CO., Ltd.) were added, followed by adding MIBK as a diluting solvent so that the solid content was 55%. The mixture was subjected to ultrasonic treatment for 5 minutes to prepare an application liquid in which the respective components were dispersed uniformly. The application liquid was applied to a TAC film ("KC4UY" (trade name), thickness: 40 µm, manufactured by Konica Minolta Holdings, Inc.) through the use of a bar coater, dried at 100° C. for 1 minute, and irradiated with UV-light of a cumulative light quantity of 300 mJ to obtain a light diffusing element having a thickness of 10.5 µm. In the light diffusing element, light diffusible fine particles (PMMA fine particles) were dispersed in a matrix. Table 1 shows the properties of the obtained light diffusing element.

<Production of an Antireflection Layer>

500 Parts of siloxane oligomer ("COLCOAT N103" (trade name), manufactured by Colcoat Co., Ltd., solid content: 2%, number average molecular weight in terms of actually measured ethylene glycol: 950), 100 parts of a curable fluorine resin having a fluoroalkyl structure and a polysiloxane structure ("OPSTAR JTA 105" (trade name), manufactured by JSR Corporation, solid content: 5%, number average molecular weight in terms of actually measured polystyrene: 8,000), 1 part of a curing agent ("JTA 105A" (trade name), manufactured by JSR Corporation), and 160.5 parts of methyl ethyl ketone (MEK) were mixed to prepare a material for forming an antireflection layer. The material for forming an antireflection layer was applied to the surface of the obtained light diffusing element with a bar coater so as to have the same width as that of the light diffusing element. Then, the material for forming an antireflection layer was cured and dried by heating at 120° C. for 3 minutes to form an antireflection layer (low refractive index layer, refractive index: 1.42, thickness: 0.11 µm). Thus, a light diffusing element A with an antireflection layer was obtained.

Reference Example 2

Production of a Light Diffusing Element

A light diffusing element B with an antireflection layer was obtained in the same way as in Reference Example 1 except that the application liquid of Reference Example 1 was applied so as to have a thickness of 10 µm. Table 1 shows the properties of the obtained light diffusing element.

Reference Example 3

Production of a Light Diffusing Element

A light diffusing element C with an antireflection layer was obtained in the same way as in Reference Example 1 except that the application liquid of Reference Example 1 was applied so as to have a thickness of 17.5 µm. Table 1 shows the properties of the obtained light diffusing element.

Reference Example 4

Production of a Light Diffusing Element

To 25 parts of fluorene-based acrylate ("OGSOL EA-0200" (trade name), manufactured by Osaka Gas Chemicals Co. Ltd., 50% MEK solution), 0.068 part of a photopolymerization initiator ("Irgacure 907" (trade name), manufactured by Ciba Specialty Chemicals), 0.625 part of a leveling agent ("GRANDIC PC 4100" (trade name), manufactured by DIC Corporation), and 2.5 parts of PMMA fine particles ("ARTPERL J4P" (trade name), average particle diameter: 2.1 µm, refractive index: 1.49, manufactured by Negami Chemical Industrial Co., Ltd.) were added. This mixture was subjected to ultrasonic treatment for 5 minutes to prepare an application liquid in which the respective components were dispersed uniformly. The application liquid was applied to a TAC film ("KC4UY" (trade name), thickness: 40 µm, manufactured by Konica Minolta Holdings, Inc.) through the use of a bar coater, dried in an oven at 100° C. for 1 minute, and irradiated with UV-light of a cumulative light quantity of 300 mJ to obtain a light diffusing element D having a thickness of 25 µm. In the light diffusing element, light diffusible fine particles (PMMA fine particles) were dispersed in a matrix. Table 1 shows the properties of the obtained light diffusing element.

Reference Example 5

Production of a Light Diffusing Element

A light diffusing sheet E ("Holographic Diffusers LSD5PE 50 deg", manufactured by Physical Optics Corporation) using the unevenness of the surface was used. Table 1 shows the properties of the light diffusing sheet.

Reference Example 6

Production of a Light Diffusing Element

To 100 parts of a hard coat resin ("Lumiplus LPB-1101" (trade name), manufactured by MITSUBISHI GAS CHEMICAL COMPANY, INC.), 1.0 part of a photopolymerization initiator ("Irgacure 907" (trade name), manufactured by Ciba Specialty Chemicals), 0.5 part of a leveling agent ("GRANDIC PC 4100" (trade name), manufactured by DIC Corporation), and 25 parts of PMMA fine particles ("XX123AA" (trade name), average particle diameter: 1.5 μm, refractive index: 1.49, manufactured by SEKISUI PLASTICS CO., Ltd.) were added, followed by adding MIBK as a diluting solvent so that the solid content was 55%. This mixture was subjected to ultrasonic treatment for 5 minutes to prepare an application liquid in which the respective components were dispersed uniformly. The application liquid was applied to a TAC film ("KC4UY" (trade name), thickness: 40 μm, manufactured by Konica Minolta Holdings, Inc.) through the use of a bar coater, dried at 100° C. for 1 minute, and irradiated with UV-light of a cumulative light quantity of 300 mJ to obtain a light diffusing element F having a thickness of 3.5 μm. Table 1 shows the properties of the obtained light diffusing element.

diffusing element of the polarizing plate). Thus, a polarizing plate A with a light diffusing element was obtained.

<Conditions>

(1) Swelling bath: pure water at 30° C.

(2) Coloring bath: aqueous solution at 30° C. containing 0.035 part by weight of iodine with respect to 100 parts by weight of water and 0.2 part by weight of potassium iodide with respect to 100 parts by weight of water (3) First cross-linking bath: aqueous solution at 40° C. containing 3% by weight of potassium iodide and 3% by weight of boric acid (4) Second cross-linking bath: aqueous solution at 60° C. containing 5% by weight of potassium iodide and 4% by weight of boric acid (5) Water-washing bath: aqueous solution at 25° C. containing 3% by weight of potassium iodide

TABLE 1

|  | Reference Example 1 | Reference Example 2 | Reference Example 3 | Reference Example 4 | Reference Example 5 | Reference Example 6 |
| --- | --- | --- | --- | --- | --- | --- |
| Light diffusing element | A | B | C | D | E | F |
| Applied film thickness (μm) | 10.5 | 10.0 | 17.5 | 25 | — | 3.5 |
| Surface reflectance (%) | 2.20 | 2.18 | 2.80 | 6.80 | 5.00 | 7.40 |
| Backscattering ratio (%) | 0.30 | 0.28 | 0.90 | 2.50 | 5.60 | 1.20 |
| Half-value angle (°) | 62 | 59 | 85 | 54 | 54 | 65 |
| Surface roughness Ra (μm) | 0.035 | 0.037 | 0.032 | 0.032 | 1.1 | 0.060 |
| Haze (%) | 98.0 | 97.9 | 98.6 | 97.9 | 97.9 | 98.1 |
| Film thickness/particle diameter | 4.2 | 4.0 | 7.0 | 10.0 | — | 2.3 |

Reference Example 7

Production of a Polarizing Plate with a Light Diffusing Element

A polymer film ("VF-PE#6000" (trade name), manufactured by Kuraray Co., Ltd.) having a thickness of 60 μm and containing a polyvinyl alcohol-based resin as a main component was immersed in five baths under the following (1) to (5) conditions while a tension was being applied in a film longitudinal direction, and stretched so that the final stretching ratio became 6.2 times the original film length. The stretched film was dried for 1 minute in an air circulation type dry oven at 40° to produce a polarizer. A polymer film (KC4UY, manufactured by Konica Minolta Holdings, Inc.) having a thickness of 40 μm and containing a cellulose-based resin was attached to one surface of the polarizer through a water-soluble adhesive ("Gohsefimer Z200" (trade name), manufactured by The Nippon Synthetic Chemical Industry Co., Ltd.) containing a polyvinyl alcohol-based resin as a main component. The light diffusing element A obtained in Reference Example 1 was attached to the surface on the opposite side of the polarizer through a water-soluble adhesive ("Gohsefimer Z200" (trade name), manufactured by The Nippon Synthetic Chemical Industry Co., Ltd.) containing a polyvinyl alcohol-based resin as a main component. After that, 20 μm of an acrylic pressure-sensitive adhesive was applied to the surface of the polymer film containing the cellulose-based resin (surface on the opposite side of the light Reference Example 8

Production of a Polarizing Plate with a Light Diffusing Element

A polarizing plate B with a light diffusing element was obtained in the same way as in Reference Example 7 except that the light diffusing element B obtained in Reference Example 2 was used.

Reference Example 9

Production of a Polarizing Plate with a Light Diffusing Element

A polarizing plate C with a light diffusing element was obtained in the same way as in Reference Example 7 except that the light diffusing element C obtained in Reference Example 3 was used.

Reference Example 10

Production of a Polarizing Plate with a Light Diffusing Element

A polarizing plate D with a light diffusing element was obtained in the same way as in Reference Example 7 except that the light diffusing element D obtained in Reference Example 4 was used.

Reference Example 11

Production of a Polarizing Plate with a Light Diffusing Element

A polarizing plate E with a light diffusing element was obtained in the same way as in Reference Example 7 except that the light diffusing sheet E obtained in Reference Example 5 was used.

Reference Example 12

Production of a Polarizing Plate with a Light Diffusing Element

A polarizing plate F with a light diffusing element was obtained in the same way as in Reference Example 7 except that the light diffusing element F obtained in Reference Example 6 was used.

Reference Example 13

Production of a Polarizing Plate (Viewer-Side Polarizing Plate)

A viewer-side polarizing plate G was obtained in the same way as in Reference Example 7 except that a polymer film (KC4UY, manufactured by Konica Minolta Holdings, Inc.) having a thickness of 40 μm and containing a cellulose-based resin was used instead of a light diffusing element.

Reference Example 14

Production of a Polarizing Plate (Backlight-Side Polarizing Plate)

A polarizer was produced in the same way as in Reference Example 7. A polymer film (KC4UY, manufactured by Konica Minolta Holdings, Inc.) having a thickness of 40 μm and containing a cellulose-based resin was attached to one surface of the polarizer through a water-soluble adhesive ("Gohsefimer Z200" (trade name), manufactured by The Nippon Synthetic Chemical Industry Co., Ltd.) containing a polyvinyl alcohol-based resin as a main component. V-TAC (Ro=55 nm, Rth=197 nm), manufactured by Fujifilm Corporation, was attached to the surface on the opposite side of the polarizer through a water-soluble adhesive ("Gohsefimer Z200" (trade name), manufactured by The Nippon Synthetic Chemical Industry Co., Ltd.) containing a polyvinyl alcohol-based resin as a main component. Thus, a backlight-side polarizing plate I was obtained.

Reference Example 15

Production of a Polarizing Plate (Backlight-Side Polarizing Plate)

A backlight-side polarizing plate J was obtained in the same way as in Reference Example 14 except that a retardation film (KC4CR-1, thickness: 41 μm, Ro=55 nm, Rth=130 nm) containing a cellulose-based resin was used instead of V-TAC (Ro=55 nm, Rth=197 nm) manufactured by Fujifilm Corporation.

Reference Example 16

Production of a Backlight Unit

A lower prism sheet was taken out from a backlight unit of a commercially available laptop personal computer ("Dynabook RX-1" (trade name), manufactured by Toshiba Corporation) and the surface of a non-prism face was wiped with ethyl acetate to remove mat treatment on the surface to obtain a smooth surface. The prism pitch of the lower prism was 150 μm. On the other hand, as a collimated light source device, a collimated light source device (half-value angle: 2°) manufactured by Chuo-seimitsu Co., Ltd. was used. The light from the light source was allowed to be incident upon the lower prism sheet at an angle of 65°, to thereby obtain a backlight unit M. The backlight half-value angle of the backlight unit was 2° in the horizontal direction, 3° in the vertical direction, and 2.5° on average.

Reference Example 17

Production of a Backlight Unit

A light guide plate was taken out from a backlight unit of a commercially available laptop personal computer ("Dynabook RX-1" (trade name), manufactured by Toshiba Corporation). A transparent acrylic plate having a thickness of 5 mm and a vertical and smooth end face was attached to one side (smooth surface side) of the light guide plate through an acrylic adhesive. Cannonball type LEDs (NSPW500CS-b1, manufactured by Nichia Corporation, Φ: 5 mm, half-value angle: 15°) were arranged along the smooth end face of the acrylic plate. On the other hand, a lower prism sheet was taken out from the backlight unit of the laptop personal computer and the surface of the non-prism was wiped with ethyl acetate to remove mat treatment on the surface to obtain a smooth surface. The lower prism sheet was placed on an upper side of the light guide plate (opposite side of the acrylic plate from the light guide plate) to obtain a backlight unit N. The backlight half-value angle of the backlight unit was 10° in the horizontal direction, 6° in the vertical direction, and 8° on average.

Reference Example 18

Production of a Backlight Unit

A backlight unit O was obtained in the same way as in Reference Example 19 except that the cannonball type LEDs were arranged at a distance of 50 mm from the smooth end face of the acrylic plate so as to enhance light condensing performance. The backlight half-value angle of the backlight unit was 7° in the horizontal direction, 3° in the vertical direction, and 5° on average.

Reference Example 19

Production of a Backlight Unit

A backlight unit P was obtained in the same way as in Reference Example 17 except that the thickness of the acrylic plate was set to be 10 mm so as to enhance light output efficiency at the slight cost of light condensing performance. The backlight half-value angle of the backlight unit was 10° in the horizontal direction, 11° in the vertical direction, and 10.5° on average.

Reference Example 20

Production of a Backlight Unit

A backlight unit Q taken out from a commercially available liquid crystal display apparatus (Bravia KDL32F1, manufactured by Sony Corporation) was used as it is. The backlight unit has a general light source that does not emit collimated light. The backlight half-value angle of the backlight unit was 109° in the horizontal direction, 68° in the vertical direction, and 88.5° on average.

Reference Example 21

Production of a Backlight Unit

A backlight unit R taken out from a commercially available liquid crystal display apparatus (AQUOS RX46, manufactured by Sharp Corporation) was used as it is. The backlight unit has a general light source that does not emit collimated light. The backlight half-value angle of the backlight unit was 96° in the horizontal direction, 69° in the vertical direction, and 82.5° on average.

Reference Example 22

Production of a Liquid Crystal Cell

A liquid crystal cell was taken out from a commercially available liquid crystal display apparatus (Bravia KDL32F1, VA mode, pixel pitch: 500 μm, manufactured by Sony Corporation), and the surfaces of upper and lower glass substrates were washed to obtain a liquid crystal cell X.

Examples 1 to 4 and Comparative Examples 1 and 2

Liquid crystal display apparatuses were produced through the use of members with the combination shown in Table 2 below. The distance between the viewer-side surface of the backlight unit and the backlight-side surface of the backlight-side polarizing plate of the liquid crystal display panel was set to be 1,000 μm, and the arrangement direction of filters of the same color and the direction of the prism were set to form an angle of 90°. The respective liquid crystal display apparatuses were evaluated for the items (1) to (6). Table 2 also shows the evaluation results.

Comparative Example 3

To 18.2 parts of a hard coat resin ("Opstar KZ6661" (trade name), manufactured by JSR Corporation), 6.8 parts of a 50 wt % MEK solution of pentaerythritol triacrylate (Biscoat #300 (trade name), manufactured by Osaka Organic Chemical Industry Ltd.), 0.068 part of a photopolymerization initiator (Irgacure 907 (trade name), manufactured by Ciba Specialty Chemicals), and 2.5 parts of light diffusible particles made of silicone resin (Tospearl 120 (trade name), manufactured by Momentive Performance Materials Inc., average particle diameter: 2.0 μm, refractive index: 1.43) were added, and the mixture was subjected to ultrasonic treatment to prepare an application liquid in which the respective components were dispersed uniformly. The application liquid was applied to a polymer film (KC4UY (trade name), manufactured by Konica Minolta Holdings, Inc.) with a bar coater, and the mixture was dried at 80° C. for 1 minute, followed by being irradiated with UV-light (metal halide lamp) of a cumulative light quantity of 300 mJ/cm² to obtain a light diffusing element having a thickness of 14 μm. An antireflection layer was provided to the light diffusing element in the same way as in Reference Example 1 to obtain a light diffusing element with an antireflection layer. A polarizing plate with a light diffusing element having a configuration of a light diffusing element/polarizer (absorption axis: 0° direction)/retardation film (KC4CR-1, slow axis: 90° direction) was obtained in the same way as in Reference Example 7 except that the light diffusing element with an antireflection layer was used and that a retardation film (KC4CR-1, front retardation: 55 nm, thickness retardation: 130 nm) having a thickness of 41 μm and containing a cellulose-based resin was used instead of a polymer film (KC4UY) having a thickness of 40 μm and containing a cellulose-based resin. The diffused light half-value angle of the light diffusing element was 60°.

A liquid crystal display apparatus was produced in the same way as in Comparative Example 2 except that the polarizing plate with a light diffusing element was used, that the polarizing plate J (absorption axis: 90° direction) of Refer-

TABLE 2

|  | Example 1 | Comparative Example 1 | Example 2 | Example 3 | Example 4 | Comparative Example 2 |
|---|---|---|---|---|---|---|
| Polarizing plate with light diffusing element | A | G** | A | B | F | A |
| Liquid crystal cell | X | X | X | X | X | X |
| Backlight-side polarizing plate | I | I | I | I | I | I |
| Backlight unit | O | Q | N | P | O | M |
| Backlight half-value angle* (H) | 7 | 109 | 10 | 10 | 7 | 2 |
| Backlight half-value angle (V) | 3 | 68 | 6 | 11 | 3 | 3 |
| Backlight half-value angle (Average) | 5 | 88.5 | 8 | 10.5 | 5 | 2.5 |
| Diffused light half-value angle of light diffusing element | 62 | — | 62 | 59 | 65 | 62 |
| Fw(BL)/Fw(FD) | 0.065 |  | 0.129 | 0.178 | 0.077 | 0.040 |
| Panel white brightness half-value angle (H) | 66 | 92 | 68 | 61 | 68 | 62 |
| Panel white brightness half-value angle (V) | 63 | 66 | 64 | 62 | 65 | 66 |
| Panel light distribution quantity (%) | 44 | 30 | 44 | 50 | 43 | 46 |
| Angle range of view average contrast in front direction | 2110 | 1467 | 1770 | 1569 | 1905 | 2274 |
| Blurring of characters | ○ | ○ | ○ | ○ | ○ | ○ |
| Moiré/glare | ○ | ○ | ○ | ○ | ○ | x |

*Unit of half-value angle is (°), H represents horizontal direction, V represents vertical direction
**No light diffusing element ence Example 15 was used as a backlight-side polarizing plate, and that a liquid crystal cell taken out from KDL-40W5 (40-inch, 53 ppi, VA mode) manufactured by Sony Corporation was used. The liquid crystal display apparatus thus obtained was evaluated for the items (1) to (6). Table 3 shows the evaluation results.

Example 5

A backlight unit was produced in the same way as in Reference Example 16 except that one light diffusing sheet (haze: 29.0%, diffused light half-value angle: 5°) taken out from a backlight unit of a commercially available laptop personal computer ("Dynabook RX-1" (trade name), manufactured by Toshiba Corporation) was inserted between a light output portion and a lower prism of a collimated light source device. The backlight half-value angle of the backlight unit was 6° in the horizontal direction, 6° in the vertical direction, and 6° on average. A liquid crystal display apparatus was produced in the same way as in Comparative Example 3 except that the backlight unit was used. The liquid crystal display apparatus thus obtained was evaluated for the items (1) to (6). Table 3 shows the evaluation results.

Example 6

A backlight unit was produced in the same way as in Example 5 except that three light diffusing sheets used in Example 5 were inserted between a light output portion and a lower prism of a collimated light source device. The backlight half-value angle of the backlight unit was 10° in the horizontal direction, 11° in the vertical direction, and 10.5° on average. A liquid crystal display apparatus was produced in the same way as in Comparative Example 3 except that the backlight unit was used. The liquid crystal display apparatus thus obtained was evaluated for the items (1) to (6). Table 3 shows the evaluation results.

Example 7

A polarizing plate with a light diffusing element was obtained in the same way as in Comparative Example 3 except that the application thickness was changed to set the thickness of the light diffusing element to be 12 μm. The diffused light half-value angle of the light diffusing element was 57°. Further, a backlight unit was produced in the same way as in Example 5 except that four light diffusing sheets used in Example 5 were inserted between a light output portion and a lower prism of a collimated light source device. The backlight half-value angle of the backlight unit was 13° in the horizontal direction, 13° in the vertical direction, and 13° on average. A liquid crystal display apparatus was produced in the same way as in Comparative Example 3 except that the polarizing plate with a light diffusing element and the backlight unit were used. The liquid crystal display apparatus thus obtained was evaluated for the items (1) to (6). Table 3 shows the evaluation results.

Example 8

A backlight unit was produced in the same way as in Example 5 except that five light diffusing sheets used in Example 5 were inserted between a light output portion and a lower prism of a collimated light source device. The backlight half-value angle of the backlight unit was 16° in the horizontal direction, 16° in the vertical direction, and 16° on average. A liquid crystal display apparatus was produced in the same way as in Example 7 except that the backlight unit was used. The liquid crystal display apparatus thus obtained was evaluated for the items (1) to (6). Table 3 shows the evaluation results.

Example 9

A backlight unit was produced in the same way as in Example 5 except that six light diffusing sheets used in Example 5 were inserted between a light output portion and a lower prism of a collimated light source device. The backlight half-value angle of the backlight unit was 18° in the horizontal direction, 19° in the vertical direction, and 18.5° on average. A liquid crystal display apparatus was produced in the same way as in Example 7 except that the backlight unit was used. The liquid crystal display apparatus thus obtained was evaluated for the items (1) to (6). Table 3 shows the evaluation results.

Example 10

A backlight unit was produced in the same way as in Example 5 except that seven light diffusing sheets used in Example 5 were inserted between a light output portion and a lower prism of a collimated light source device. The backlight half-value angle of the backlight unit was 22° in the horizontal direction, 21° in the vertical direction, and 21.5° on average. A liquid crystal display apparatus was produced in the same way as in Example 7 except that the backlight unit was used. The liquid crystal display apparatus thus obtained was evaluated for the items (1) to (6). Table 3 shows the evaluation results.

Example 11

A backlight unit was produced in the same way as in Example 5 except that one light diffusing sheet used in Example 5 and a transparent film (TD80UL, manufactured by Fujifilm Corporation) in which two light diffusing pressure-sensitive adhesive layers as described below were laminated were placed on a lower prism. The backlight half-value angle of the backlight unit was 24° in the horizontal direction, 23° in the vertical direction, and 23.5° on average. A liquid crystal display apparatus was produced in the same way as in Example 7 except that the backlight unit was used. The liquid crystal display apparatus thus obtained was evaluated for the items (1) to (6). Table 3 shows the evaluation results.

Light diffusing pressure-sensitive adhesive layer: 3.8 parts of fine particles made of silicone resin (Tospearl 140 (trade name), manufactured by Momentive Performance Materials Inc., volume average particle diameter: 4.2 μm) were added to 100 parts of a pressure-sensitive adhesive solution (solid content: 11%) containing an acrylic pressure-sensitive adhesive and a solvent, and the mixture was stirred for 1 hour. Then, the mixture was applied to the surface of a polyethylene terephthalate (PET) film subjected to release treatment and dried at 120° C., and the PET film was peeled to form a light diffusing pressure-sensitive adhesive layer having a thickness of 23 μm. The haze of the light diffusing pressure-sensitive adhesive layer thus obtained was 80%.

Example 12

A backlight unit was produced in the same way as in Example 5 except that two light diffusing sheets used in Example 5 and a transparent film (TD80UL, manufactured by Fujifilm Corporation) in which two light diffusing pressure-sensitive adhesive layers of Example 11 were laminated were placed on a lower prism. The backlight half-value angle of the backlight unit was 26° in the horizontal direction, 27° in the vertical direction, and 26.5° on average. A liquid crystal display apparatus was produced in the same way as in Example 7 except that the backlight unit was used. The liquid crystal display apparatus thus obtained was evaluated for the items (1) to (6). Table 3 shows the evaluation results.

Example 13

A backlight unit was produced in the same way as in Example 5 except that three light diffusing sheets used in Example 5 and a transparent film (TD80UL, manufactured by Fujifilm Corporation) in which two light diffusing pressure-sensitive adhesive layers of Example 11 were laminated were placed on a lower prism. The backlight half-value angle of the backlight unit was 28° in the horizontal direction, 28° in the vertical direction, and 28° on average. A liquid crystal display apparatus was produced in the same way as in Example 7 except that the backlight unit was used. The liquid crystal display apparatus thus obtained was evaluated for the items (1) to (6). Table 3 shows the evaluation results.

Example 14

A backlight unit was produced in the same way as in Example 5 except that a transparent film (TD80UL, manufactured by Fujifilm Corporation) in which three light diffusing pressure-sensitive adhesive layers of Example 11 were laminated was placed on a lower prism. The backlight half-value angle of the backlight unit was 30° in the horizontal direction, 29° in the vertical direction, and 29.5° on average. A liquid crystal display apparatus was produced in the same way as in Example 7 except that the backlight unit was used. The liquid crystal display apparatus thus obtained was evaluated for the items (1) to (6). Table 3 shows the evaluation results.

Comparative Example 4

A polarizing plate with a light diffusing element was obtained in the same way as in Comparative Example 3 except that the application thickness was changed to set the thickness of a light diffusing element to be 11 μm. The diffused light half-value angle of the light diffusing element was 53°. Further, a backlight unit was produced in the same way as in Example 5 except that a transparent film (TD80UL, manufactured by Fujifilm Corporation) in which four light diffusing pressure-sensitive adhesive layers of Example 11 were laminated was placed on a lower prism. The backlight half-value angle of the backlight unit was 37° in the horizontal direction, 37° in the vertical direction, and 37° on average. A liquid crystal display apparatus was produced in the same way as in Comparative Example 3 except that the polarizing plate with a light diffusing element and the backlight unit were used. The liquid crystal display apparatus thus obtained was evaluated for the items (1) to (6). Table 3 shows the evaluation results.

Comparative Example 5

A polarizing plate with a light diffusing element was obtained in the same way as in Comparative Example 3 except that the application thickness was changed to set the thickness of a light diffusing element to be 9 μm. The diffused light half-value angle of the light diffusing element was 45°.

Further, a backlight unit was produced in the same way as in Example 5 except that a transparent film (TD80UL, manufactured by Fujifilm Corporation) in which five light diffusing pressure-sensitive adhesive layers of Example 11 were laminated was placed on a lower prism. The backlight half-value angle of the backlight unit was 44° in the horizontal direction, 45° in the vertical direction, and 44.5° on average. A liquid crystal display apparatus was produced in the same way as in Comparative Example 3 except that the polarizing plate with a light diffusing element and the backlight unit were used. The liquid crystal display apparatus thus obtained was evaluated for the items (1) to (6). Table 3 shows the evaluation results.

Comparative Example 6

To 100 parts of a pressure-sensitive adhesive solution (solid content: 11%) containing an acrylic pressure-sensitive adhesive and a solvent, 3.8 parts of fine particles made of silicone resin (Tospearl 140 (trade name), manufactured by Momentive Performance Materials Inc., volume average particle diameter: 4.2 μm) were added, and the mixture was stirred for 1 hour. Then, the mixture was applied to the surface of a PET film subjected to release treatment and dried at 120° C., and thereafter, the PET film was peeled to form a light diffusing pressure-sensitive adhesive layer having a thickness of 23 μm. The haze of the light diffusing pressure-sensitive adhesive layer thus obtained was 80%. On the other hand, a polarizing plate having a configuration of a polymer film (KC4UY)/polarizer (absorption axis: 0° direction)/retardation film (KC4CR-1, slow axis: 90° direction) was obtained in the same way as in Reference Example 15 except that a retardation film (KC4CR-1, front retardation: 55 nm, thickness retardation: 130 nm) having a thickness of 41 μm and containing a cellulose-based resin was used instead of V-TAC manufactured by Fujifilm Corporation. Four light diffusing pressure-sensitive adhesive layers described above were laminated outside of the polymer film of the polarizing plate, and a transparent film (TD80UL, manufactured by Fujifilm Corporation) was attached to the four light diffusing pressure-sensitive adhesive layers to obtain a polarizing plate with a light diffusing pressure-sensitive adhesive layer having a configuration of a transparent film (TD80UL)/four light diffusing pressure-sensitive adhesive layers/polymer film (KC4UY)/polarizer (absorption axis: 0° direction)/retardation film (KC4CR-1, slow axis: 90° direction). The diffused light half-value angle of the light diffusing element was 37°.

Further, a backlight unit was produced in the same way as in Example 5 except that a transparent film (TD80UL, manufactured by Fujifilm Corporation) in which six light diffusing pressure-sensitive adhesive layers of Example 11 were laminated was placed on a lower prism. The backlight half-value angle of the backlight unit was 52° in the horizontal direction, 53° in the vertical direction, and 52.5° on average. A liquid crystal display apparatus was produced in the same way as in Comparative Example 3 except that the above-mentioned polarizing plate with a light diffusing pressure-sensitive adhesive layer and backlight unit were used. The liquid crystal display apparatus thus obtained was evaluated for the items (1) to (6). Table 3 shows the evaluation results.

Comparative Example 7

A polarizing plate with a light diffusing pressure-sensitive adhesive layer having a configuration of a transparent film (TD80UL)/three light diffusing pressure-sensitive adhesive layers/polymer film (KC4UY)/polarizer (absorption axis: 0° direction)/retardation film (KC4CR-1, slow axis: 90° direction) was obtained in the same way as in Comparative Example 6 except that three light diffusing pressure-sensitive adhesive layers were laminated. The diffused light half-value angle of the light diffusing element was 30°.

Further, a backlight unit was produced in the same way as in Example 5 except that a transparent film (TD80UL, manufactured by Fujifilm Corporation) in which seven light diffusing pressure-sensitive adhesive layers of Example 11 were laminated was placed on a lower prism. The backlight half-value angle of the backlight unit was 59° in the horizontal direction, 59° in the vertical direction, and 59° on average. A liquid crystal display apparatus was produced in the same way as in Comparative Example 3 except that the polarizing plate with a light diffusing pressure-sensitive adhesive layer and the backlight unit were used. The liquid crystal display apparatus thus obtained was evaluated for the items (1) to (6). Table 3 shows the evaluation results.

Comparative Example 8

A polarizing plate with a light diffusing pressure-sensitive adhesive layer having a configuration of a transparent film (TD80UL)/two light diffusing pressure-sensitive adhesive layers/polymer film (KC4UY)/polarizer (absorption axis: 0° direction)/retardation film (KC4CR-1, slow axis: 90° direction) was obtained in the same way as in Comparative Example 6 except that two light diffusing pressure-sensitive adhesive layers were laminated. The diffused light half-value angle of the light diffusing element was 20°.

Further, a backlight unit was produced in the same way as in Example 5 except that a transparent film (TD80UL, manufactured by Fujifilm Corporation) in which eight light diffusing pressure-sensitive adhesive layers of Example 11 were laminated was placed on a lower prism. The backlight half-value angle of the backlight unit was 65° in the horizontal direction, 65° in the vertical direction, and 65° on average. A liquid crystal display apparatus was produced in the same way as in Comparative Example 3 except that the polarizing plate with a light diffusing pressure-sensitive adhesive layer and the backlight unit were used. The liquid crystal display apparatus thus obtained was evaluated for the items (1) to (6). Table 3 shows the evaluation results.

Comparative Example 9

A polarizing plate with a light diffusing pressure-sensitive adhesive layer having a configuration of a transparent film (TD80UL)/light diffusing pressure-sensitive adhesive layer/polymer film (KC4UY)/polarizer (absorption axis: 0° direction)/retardation film (KC4CR-1, slow axis: 90° direction) was obtained in the same way as in Comparative Example 6 except that one light diffusing pressure-sensitive adhesive layer was laminated. The diffused light half-value angle of the light diffusing element was 12°.

Further, a backlight unit was produced in the same way as in Example 5 except that a transparent film (TD80UL, manufactured by Fujifilm Corporation) in which nine light diffusing pressure-sensitive adhesive layers of Example 11 were laminated was placed on a lower prism. The backlight half-value angle of the backlight unit was 71° in the horizontal direction, 73° in the vertical direction, and 72° on average. A liquid crystal display apparatus was produced in the same way as in Comparative Example 3 except that the polarizing plate with a light diffusing pressure-sensitive adhesive layer and the backlight unit were used. The liquid crystal display apparatus thus obtained was evaluated for the items (1) to (6). Table 3 shows the evaluation results.

Comparative Example 10

A viewer-side polarizing plate having a configuration of a polymer film (KC4UY)/polarizer (absorption axis: 0° direction)/retardation film (KC4CR-1, slow axis: 90° direction) was obtained in the same way as in Comparative Example 6 except that no light diffusing pressure-sensitive adhesive layer was laminated.

Further, a backlight unit was produced in the same way as in Example 5 except that a transparent film (TD80UL, manufactured by Fujifilm Corporation) in which ten light diffusing pressure-sensitive adhesive layers of Example 11 were laminated was placed on a lower prism. The backlight half-value angle of the backlight unit was 75° in the horizontal direction, 77° in the vertical direction, and 76° on average. A liquid crystal display apparatus was produced in the same way as in Comparative Example 3 except that the viewer-side polarizing plate and the backlight unit were used. The liquid crystal display apparatus thus obtained was evaluated for the items (1) to (6). Table 3 shows the evaluation results.

TABLE 3

|  | Comparative Example 3 | Example 5 | Example 6 | Example 7 | Example 8 | Example 9 | Example 10 | Example 11 |
|---|---|---|---|---|---|---|---|---|
| Backlight half-value angle (H) | 2 | 6 | 10 | 13 | 16 | 18 | 22 | 24 |
| Backlight half-value angle (V) | 3 | 6 | 11 | 13 | 16 | 19 | 21 | 23 |
| Backlight half-value angle (Average) | 2.5 | 6 | 10.5 | 13 | 16 | 18.5 | 21.5 | 23.5 |
| Diffused light half-value angle of light diffusing element | 60 | 60 | 60 | 57 | 57 | 57 | 57 | 57 |
| Fw(BL)/Fw(FD) | 0.04 | 0.10 | 0.18 | 0.23 | 0.28 | 0.32 | 0.38 | 0.41 |
| Panel white brightness half-value angle (H) | 60 | 62 | 65 | 61 | 63 | 65 | 65 | 65 |
| Panel white brightness half-value angle (V) | 59 | 61 | 65 | 62 | 62 | 65 | 67 | 66 |
| Panel white brightness half-value angle (Average) | 59.5 | 61.5 | 65 | 61.5 | 62.5 | 65 | 66 | 65.5 |
| Panel light distribution quantity (%) | 46 | 45 | 43 | 45 | 44 | 43 | 43 | 43 |
| Maximum contrast within angle range of view | 5319 | 4792 | 3913 | 3927 | 3440 | 3055 | 2951 | 3009 |
| Minimum contrast within angle range of view | 3705 | 3611 | 3060 | 2938 | 2593 | 2349 | 2273 | 2317 |

TABLE 3-continued

|  | Example 12 | Example 13 | Example 14 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Angle range of view average contrast | 4619 | 4415 | 3656 | 3617 | 3177 | 2843 | 2738 | 2791 | | |
| Uniformity of image quality within angle range of view | 0.3 | 0.3 | 0.2 | 0.3 | 0.3 | 0.2 | 0.2 | 0.2 | | |
| Blurring of characters and image | ○ | ○ | ○ | ○ | ○ | ○ | ○ | ○ | | |
| Moiré/glare | x | ○ | ○ | ○ | ○ | ○ | ○ | ○ | | |
| Backlight half-value angle (H) | 26 | 28 | 30 | 37 | 44 | 52 | 59 | 65 | 71 | 75 |
| Backlight half-value angle (V) | 27 | 28 | 29 | 37 | 45 | 53 | 59 | 65 | 73 | 77 |
| Backlight half-value angle (Average) | 26.5 | 28 | 29.5 | 37 | 44.5 | 52.5 | 59 | 65 | 72 | 76 |
| Diffused light half-value angle of light diffusing element | 57 | 57 | 57 | 53 | 45 | 37 | 30 | 20 | 12 | 0 |
| Fw(BL)/Fw(FD) | 0.46 | 0.49 | 0.5 | 0.7 | 1.0 | 1.4 | 2.0 | 3.3 | 6.0 | |
| Panel white brightness half-value angle (H) | 67 | 69 | 67 | 67 | 70 | 70 | 70 | 70 | 72 | 66 |
| Panel white brightness half-value angle (V) | 67 | 68 | 70 | 69 | 69 | 68 | 68 | 68 | 67 | 67 |
| Panel white brightness half-value angle (Average) | 67 | 68.5 | 68.5 | 68 | 69.5 | 69 | 69 | 69 | 69.5 | 66.5 |
| Panel light distribution quantity (%) | 43 | 42 | 42 | 42 | 42 | 42 | 42 | 43 | 42 | 43 |
| Maximum contrast within angle range of view | 2798 | 2655 | 2509 | 2348 | 2235 | 2479 | 2608 | 2916 | 3643 | 4350 |
| Minimum contrast within angle range of view | 2170 | 2064 | 1860 | 1750 | 1260 | 1065 | 1077 | 1223 | 1425 | 1632 |
| Angle range of view average contrast | 2602 | 2468 | 2335 | 1619 | 1531 | 1550 | 1597 | 1998 | 2234 | 2635 |
| Uniformity of image quality within angle range of view | 0.2 | 0.2 | 0.3 | 0.4 | 0.6 | 0.9 | 1.0 | 0.8 | 1.0 | 1.0 |
| Blurring of characters and image | ○ | ○ | ○ | Δ | Δ | Δ | Δ | Δ | ○ | ○ |
| Moiré/glare | ○ | ○ | ○ | ○ | ○ | ○ | ○ | ○ | ○ | ○ |

Comparative Example 11

To 18.2 parts of a hard coat resin (Opstar KZ6661 (trade name), manufactured by JSR Corporation), 6.8 parts of a 50 wt % MEK solution of pentaerythritol triacrylate (Biscoat #300 (trade name), manufactured by Osaka Organic Chemical Industry Ltd.), 0.068 part of a photopolymerization initiator (Irgacure 907 (trade name), manufactured by Ciba Specialty Chemicals), and 2.5 parts of light diffusible particles made of silicone resin (Tospearl 120 (trade name), manufactured by Momentive Performance Materials Inc., average particle diameter: 2.0 μm, refractive index: 1.43) were added, and the mixture was subjected to ultrasonic treatment to prepare an application liquid in which the respective components were dispersed uniformly. The application liquid was applied to a polymer film (KC4UY (trade name), manufactured by Konica Minolta Holdings, Inc.) with a bar coater, and the mixture was dried at 80° C. for 1 minute, followed by being irradiated with UV-light (metal halide lamp) of a cumulative light quantity of 300 mJ/cm$^2$ to obtain a light diffusing element having a thickness of 14 μm. An antireflection layer was provided to the light diffusing element in the same way as in Reference Example 1 to obtain a light diffusing element with an antireflection layer. A polarizing plate with a light diffusing element having a configuration of a light diffusing element/polarizer (absorption axis: 0° direction)/polymer film (KC4UY) was obtained in the same way as in Reference Example 7 except that the light diffusing element with an antireflection layer was used. The diffused light half-value angle of the light diffusing element was 60°.

A liquid crystal display apparatus was produced in the same way as in Comparative Example 3 except that the polarizing plate with a light diffusing element was used, that a polarizing plate using a polymer film (KC4UY) instead of the light diffusing element of the polarizing plate with a light diffusing element and having a configuration of a polymer film (KC4UY)/polarizer (absorption axis: 90° direction)/polymer film (KC4UY) was used as a backlight-side polarizing plate, and that a liquid crystal cell taken out from REGZA 42Z-1 (IPS mode) manufactured by Toshiba Corporation was used. The liquid crystal display apparatus thus obtained was evaluated for the items (1) to (6). Table 4 shows the evaluation results.

Example 15

A liquid crystal display apparatus was produced in the same way as in Comparative Example 11 except that the backlight unit of Example 5 was used. The liquid crystal display apparatus thus obtained was evaluated for the items (1) to (6). Table 4 shows the evaluation results.

Example 16

A liquid crystal display apparatus was produced in the same way as in Comparative Example 11 except that the backlight unit of Example 6 was used. The liquid crystal display apparatus thus obtained was evaluated for the items (1) to (6). Table 4 shows the evaluation results.

Example 17

A polarizing plate with a light diffusing element was obtained in the same way as in Comparative Example 11 except that the application thickness was changed to set the thickness of the light diffusing element to be 12 μm. The diffused light half-value angle of the light diffusing element was 57°. A liquid crystal display apparatus was produced in the same way as in Comparative Example 11 except that the polarizing plate with a light diffusing element was used and that the backlight unit of Example 7 was used. The liquid crystal display apparatus thus obtained was evaluated for the items (1) to (6). Table 4 shows the evaluation results.

Example 18

A liquid crystal display apparatus was produced in the same way as in Example 17 except that the backlight unit of Example 8 was used. The liquid crystal display apparatus thus obtained was evaluated for the items (1) to (6). Table 4 shows the evaluation results.

Example 19

A liquid crystal display apparatus was produced in the same way as in Example 17 except that the backlight unit of Example 9 was used. The liquid crystal display apparatus thus obtained was evaluated for the items (1) to (6). Table 4 shows the evaluation results.

Example 20

A liquid crystal display apparatus was produced in the same way as in Example 17 except that the backlight unit of Example 10 was used. The liquid crystal display apparatus thus obtained was evaluated for the items (1) to (6). Table 4 shows the evaluation results.

Example 21

A liquid crystal display apparatus was produced in the same way as in Example 17 except that the backlight unit of Example 11 was used. The liquid crystal display apparatus thus obtained was evaluated for the items (1) to (6). Table 4 shows the evaluation results.

Example 22

A liquid crystal display apparatus was produced in the same way as in Example 17 except that the backlight unit of Example 12 was used. The liquid crystal display apparatus thus obtained was evaluated for the items (1) to (6). Table 4 shows the evaluation results.

Example 23

A liquid crystal display apparatus was produced in the same way as in Example 17 except that the backlight unit of Example 13 was used. The liquid crystal display apparatus thus obtained was evaluated for the items (1) to (6). Table 4 shows the evaluation results.

Comparative Example 12

A polarizing plate with a light diffusing element was obtained in the same way as in Comparative Example 11 except that the application thickness was changed to set the thickness of the light diffusing element to be 11 µm. The diffused light half-value angle of the light diffusing element was 53°. A liquid crystal display apparatus was produced in the same way as in Comparative Example 11 except that the polarizing plate with a light diffusing element was used and that the backlight unit of Comparative Example 4 was used. The liquid crystal display apparatus thus obtained was evaluated for the items (1) to (6). Table 4 shows the evaluation results.

Comparative Example 13

A polarizing plate with a light diffusing element was obtained in the same way as in Comparative Example 11 except that the application thickness was changed to set the thickness of the light diffusing element to be 9 µm. The diffused light half-value angle of the light diffusing element was 45°. A liquid crystal display apparatus was produced in the same way as in Comparative Example 11 except that the polarizing plate with a light diffusing element was used and that the backlight unit of Comparative Example 5 was used. The liquid crystal display apparatus thus obtained was evaluated for the items (1) to (6). Table 4 shows the evaluation results.

Comparative Example 14

To 100 parts of a pressure-sensitive adhesive solution (solid content: 11%) containing an acrylic pressure-sensitive adhesive and a solvent, 3.8 parts of fine particles made of silicone resin (Tospearl 140 (trade name), manufactured by Momentive Performance Materials Inc., volume average particle diameter: 4.2 µm) were added, and the mixture was stirred for 1 hour. Then, the mixture was applied to the surface of a PET film subjected to release treatment and dried at 120° C., and thereafter, the PET film was peeled to form a light diffusing pressure-sensitive adhesive layer having a thickness of 23 µm. The haze of the light diffusing pressure-sensitive adhesive layer thus obtained was 80%. Four light diffusing pressure-sensitive adhesive layers described above were laminated on one side of the polarizing plate of Reference Example 15, and a transparent film (TD80UL, manufactured by Fujifilm Corporation) was attached to the four light diffusing pressure-sensitive adhesive layers to obtain a polarizing plate with a light diffusing pressure-sensitive adhesive layer having a configuration of a transparent film (TD80UL)/four light diffusing pressure-sensitive adhesive layers/polymer film (KC4UY)/polarizer (absorption axis: 0° direction)/polymer film (KC4UY). The diffused light half-value angle of the light diffusing element was 37°. A liquid crystal display apparatus was produced in the same way as in Comparative Example 11 except that the polarizing plate with a light diffusing element was used and that the backlight unit of Comparative Example 6 was used. The liquid crystal display apparatus thus obtained was evaluated for the items (1) to (6). Table 4 shows the evaluation results.

Comparative Example 15

A polarizing plate with a light diffusing pressure-sensitive adhesive layer having a configuration of a transparent film (TD80UL)/three light diffusing pressure-sensitive adhesive layers/polymer film (KC4UY)/polarizer (absorption axis: 0° direction)/polymer film (KC4UY) was obtained in the same way as in Comparative Example 14 except that three light diffusing pressure-sensitive adhesive layers were laminated. The diffused light half-value angle of the light diffusing element was 30°. A liquid crystal display apparatus was produced in the same way as in Comparative Example 11 except that the polarizing plate with a light diffusing element was used and that the backlight unit of Comparative Example 7 was used. The liquid crystal display apparatus thus obtained was evaluated for the items (1) to (6). Table 4 shows the evaluation results.

Comparative Example 16

A polarizing plate with a light diffusing pressure-sensitive adhesive layer having a configuration of a transparent film (TD80UL)/two light diffusing pressure-sensitive adhesive layers/polymer film (KC4UY)/polarizer (absorption axis: 0° direction)/polymer film (KC4UY) was obtained in the same way as in Comparative Example 14 except that two light diffusing pressure-sensitive adhesive layers were laminated. The diffused light half-value angle of the light diffusing element was 20°. A liquid crystal display apparatus was produced in the same way as in Comparative Example 11 except that the polarizing plate with a light diffusing element was used and that the backlight unit of Comparative Example 8 was used. The liquid crystal display apparatus thus obtained was evaluated for the items (1) to (6). Table 4 shows the evaluation results.

Comparative Example 17

A polarizing plate with a light diffusing pressure-sensitive adhesive layer having a configuration of a transparent film (TD80UL)/light diffusing pressure-sensitive adhesive layer/polymer film (KC4UY)/polarizer (absorption axis: 0° direction)/polymer film (KC4UY) was obtained in the same way as in Comparative Example 14 except that one light diffusing pressure-sensitive adhesive layer was laminated. The diffused light half-value angle of the light diffusing element was 12°. A liquid crystal display apparatus was produced in the same way as in Comparative Example 11 except that the polarizing plate with a light diffusing element was used and that the backlight unit of Comparative Example 9 was used. The liquid crystal display apparatus thus obtained was evaluated for the items (1) to (6). Table 4 shows the evaluation results.

Comparative Example 18

A viewer-side polarizing plate having a configuration of a polymer film (KC4UY)/polarizer (absorption axis: 0° direction)/polymer film (KC4UY) was obtained in the same way as in Comparative Example 14 except that no light diffusing pressure-sensitive adhesive layer was laminated. A liquid crystal display apparatus was produced in the same way as in Comparative Example 11 except that the viewer-side polarizing plate was used and that the backlight unit of Comparative Example 10 was used. The liquid crystal display apparatus thus obtained was evaluated for the items (1) to (6). Table 4 shows the evaluation results.

TABLE 4

|  | Comparative Example 11 | Example 15 | Example 16 | Example 17 | Example 18 | Example 19 | Example 20 | Example 21 |
|---|---|---|---|---|---|---|---|---|
| Backlight half-value angle (H) | 2 | 6 | 10 | 13 | 16 | 18 | 22 | 24 |
| Backlight half-value angle (V) | 3 | 6 | 11 | 13 | 16 | 19 | 21 | 23 |
| Backlight half-value angle (Average) | 2.5 | 6 | 10.5 | 13 | 16 | 18.5 | 21.5 | 23.5 |
| Diffused light half-value angle of light diffusing element | 60 | 60 | 60 | 57 | 57 | 57 | 57 | 57 |
| Fw(BL)/Fw(FD) | 0.04 | 0.10 | 0.18 | 0.23 | 0.28 | 0.32 | 0.38 | 0.41 |
| Panel white brightness half-value angle (H) | 60 | 61 | 64 | 65 | 66 | 68 | 66 | 67 |
| Panel white brightness half-value angle (V) | 63 | 63 | 67 | 67 | 69 | 70 | 67 | 67 |
| Panel white brightness half-value angle (Average) | 61.5 | 62 | 65.5 | 66 | 67.5 | 69 | 66.5 | 67 |
| Panel light distribution quantity (%) | 46 | 43 | 43 | 43 | 43 | 42 | 43 | 43 |
| Maximum contrast within angle range of view | 1000 | 1009 | 873 | 818 | 756 | 672 | 670 | 684 |
| Minimum contrast within angle range of view | 913 | 904 | 772 | 717 | 649 | 571 | 560 | 565 |
| Angle range of view average contrast | 974 | 974 | 766 | 714 | 655 | 618 | 577 | 544 |
| Uniformity of image quality within angle range of view | 0.1 | 0.1 | 0.1 | 0.1 | 0.2 | 0.2 | 0.2 | 0.2 |
| Blurring of characters and image | ○ | ○ | ○ | ○ | ○ | ○ | ○ | ○ |
| Moiré/glare | x | ○ | ○ | ○ | ○ | ○ | ○ | ○ |

|  | Example 22 | Example 23 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|
| Backlight half-value angle (H) | 26 | 28 | 37 | 44 | 52 | 59 | 65 | 71 | 75 |
| Backlight half-value angle (V) | 27 | 28 | 37 | 45 | 53 | 59 | 65 | 73 | 77 |
| Backlight half-value angle (Average) | 26.5 | 28 | 37 | 44.5 | 52.5 | 59 | 65 | 72 | 76 |
| Diffused light half-value angle of light diffusing element | 57 | 57 | 53 | 45 | 37 | 30 | 20 | 12 | 0 |
| Fw(BL)/Fw(FD) | 0.46 | 0.49 | 0.7 | 1.0 | 1.4 | 2.0 | 3.3 | 6.0 | — |
| Panel white brightness half-value angle (H) | 66 | 68 | 70 | 70 | 71 | 71 | 72 | 72 | 69 |
| Panel white brightness half-value angle (V) | 68 | 69 | 71 | 72 | 72 | 73 | 73 | 71 | 72 |
| Panel white brightness half-value angle (Average) | 67 | 68.5 | 70.5 | 71 | 71.5 | 72 | 72.5 | 71.5 | 70.5 |
| Panel light distribution quantity (%) | 43 | 43 | 42 | 42 | 42 | 24 | 42 | 42 | 42 |
| Maximum contrast within angle range of view | 630 | 577 | 417 | 418 | 389 | 463 | 558 | 630 | 689 |
| Minimum contrast within angle range of view | 514 | 463 | 334 | 293 | 253 | 279 | 308 | 315 | 324 |
| Angle range of view average contrast | 512 | 479 | 413 | 380 | 347 | 400 | 459 | 551 | 571 |

TABLE 4-continued

| | | | | | | | | | |
|---|---|---|---|---|---|---|---|---|---|
| Uniformity of image quality within angle range of view | 0.2 | 0.2 | 0.3 | 0.3 | 0.4 | 0.5 | 0.5 | 0.6 | 0.6 |
| Blurring of characters and image | ○ | ○ | Δ | Δ | Δ | Δ | Δ | ○ | ○ |
| Moiré/glare | ○ | ○ | ○ | ○ | ○ | ○ | ○ | ○ | ○ |

EVALUATION

Figure 4:
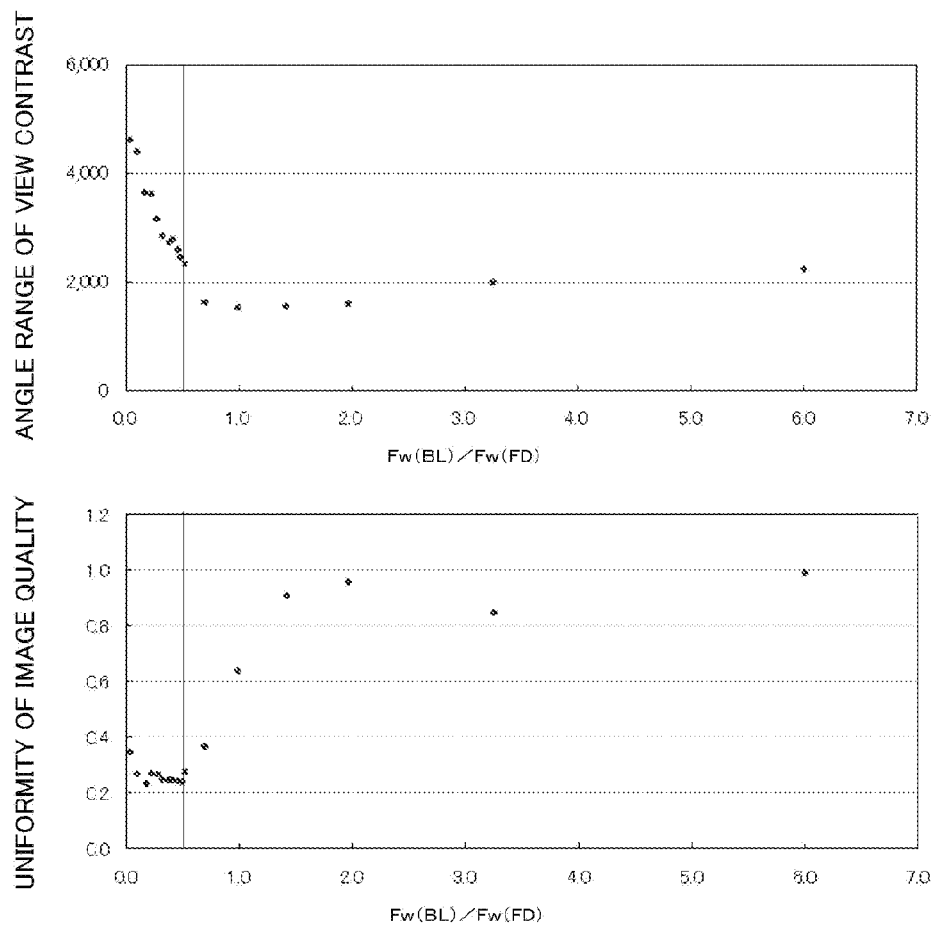
FIG. 4 is graphs respectively showing a relationship between an angle range of view contrast and a ratio Fw(BL)/Fw(FD) of a diffused light half-value angle Fw(FD) of a light diffusing element and a brightness half-value angle Fw(BL) of collimated light, and a relationship between uniformity of image quality and the ratio Fw(BL)/Fw(FD) in VA mode liquid crystal display apparatuses of Examples and Comparative Examples.
Figure 5:
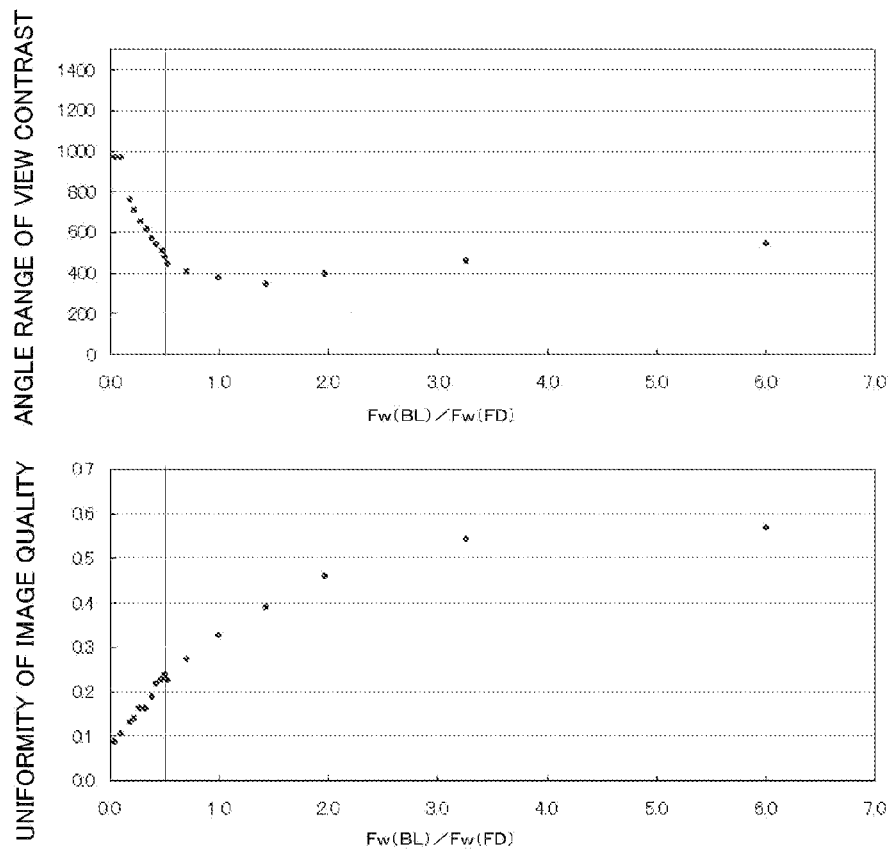
FIG. 5 is graphs respectively showing a relationship between the angle range of view contrast and the ratio Fw(BL)/Fw(FD) of the diffused light half-value angle Fw(FD) of the light diffusing element and the brightness half-value angle Fw(BL) of collimated light, and a relationship between the uniformity of image quality and the ratio Fw(BL)/Fw(FD) in IPS mode liquid crystal display apparatuses of Examples and Comparative Examples.

As is apparent from Tables 2 to 4, in the liquid crystal display apparatuses of the examples according to the present invention, in any of a VA mode and an IPS mode, high contrast and excellent uniformity of image quality are obtained over an entire region within an angle range of view, no blurring and blot of characters are identified, and small uneven display such as moiré and glare is prevented. For example, when the backlight half-value angle is too small as in Comparative Examples 2, 3, and 11, moiré and glare are identified. Further, for example, when Fw(BL)/Fw(FD) exceeds 0.5 as in Comparative Examples 4 to 8 and 12 to 16, the blurring and blot of characters are identified, and the uniformity of image quality within an angle range of view is degraded remarkably. Further, FIG. 4 shows graphs respectively illustrating a relationship between Fw(BL)/Fw(FD) and the angle range of view contrast and a relationship between Fw(BL)/Fw(FD) and the uniformity of image quality within an angle range of view in Examples 5 to 14 and Comparative Examples 3 to 9. FIG. 5 shows graphs respectively illustrating a relationship between Fw(BL)/Fw(FD) and the angle range of view contrast and a relationship between Fw(BL)/Fw(FD) and the uniformity of image quality within an angle range of view in Examples 15 to 23 and Comparative Examples 11 to 17. As shown in FIG. 4, it is understood that both the angle range of view contrast and the uniformity of image quality change critically after 0.5 of Fw(BL)/Fw(FD) in a VA mode. As shown in FIG. 5, it is understood that the angle range of view contrast changes critically after 0.5 of Fw(BL)/Fw(FD) in an IPS mode.

INDUSTRIAL APPLICABILITY

The liquid crystal display apparatus of the present invention can be used preferably, for example: in OA equipment such as a monitor for a personal computer, a notebook personal computer, and a copying machine; mobile equipment such as a mobile telephone, a watch, a digital camera, a personal digital assistant (PDA), and a mobile game machine; household electric appliances such as a video camera, a television, and a microwave oven; on-vehicle equipment such as a back monitor, a monitor for a car navigation system, and a car audio; exhibition equipment such as an information monitor for commercial shops; security equipment such as a monitoring device; and nursing and medical equipment such as a monitor for nursing care and a medical monitor.

REFERENCE SIGNS LIST

100 liquid crystal display apparatus
110 liquid crystal cell
111 substrate
112 substrate
113 liquid crystal layer
120 polarizing plate
130 polarizing plate
140 backlight unit
150 light diffusing element

The invention claimed is:

1. A liquid crystal display apparatus, comprising:
a liquid crystal cell;
polarizing plates placed on both sides of the liquid crystal cell;
a light diffusing element provided outside of the polarizing plate on a viewer side; and
a backlight unit provided outside of the polarizing plate on an opposite side of the viewer side,
wherein the backlight unit comprises a collimated light source device that emits collimated light having a brightness half-value angle of 3° to 35° toward the liquid crystal cell,
wherein a ratio Fw(BL)/Fw(FD) between a diffused light half-value angle Fw(FD) of the light diffusing element and the brightness half-value angle Fw(BL) of the collimated light is 0.5 or less, and
wherein the light diffusing element comprises light diffusible fine particles.

2. A liquid crystal display apparatus according to claim 1, which has a panel size of 32 inches or more.

3. A liquid crystal display apparatus according to claim 1, wherein the liquid crystal cell comprises a VA mode liquid crystal cell or an IPS mode liquid crystal cell.

4. A liquid crystal display apparatus according to claim 2, wherein the liquid crystal cell comprises a VA mode liquid crystal cell or an IPS mode liquid crystal cell.

* * * * *